US010833617B2

(12) United States Patent
Nakase et al.

(10) Patent No.: US 10,833,617 B2
(45) Date of Patent: Nov. 10, 2020

(54) MOTOR DRIVE APPARATUS AND REFRIGERATION CYCLE APPARATUS

(71) Applicant: Mitsubishi Electric Corporation, Tokyo (JP)

(72) Inventors: Shusaku Nakase, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 167 days.

(21) Appl. No.: 15/545,352

(22) PCT Filed: Apr. 13, 2015

(86) PCT No.: PCT/JP2015/061393
§ 371 (c)(1),
(2) Date: Jul. 21, 2017

(87) PCT Pub. No.: WO2016/166802
PCT Pub. Date: Oct. 20, 2016

(65) Prior Publication Data
US 2018/0013368 A1    Jan. 11, 2018

(51) Int. Cl.
*F25B 13/00* (2006.01)
*H02P 23/14* (2006.01)
(Continued)

(52) U.S. Cl.
CPC .............. *H02P 23/14* (2013.01); *F25B 13/00* (2013.01); *F25B 47/025* (2013.01);
(Continued)

(58) Field of Classification Search
CPC ........ H02P 23/14; H02P 27/085; H02P 27/08; F25B 13/00; F25B 47/025; F25B 2600/021
See application file for complete search history.

(56) References Cited

U.S. PATENT DOCUMENTS 4,889,474 A * 12/1989 Nakajima ............ B60H 1/3223
417/295
4,934,399 A * 6/1990 Cho .................... G05D 16/2013
137/14
(Continued)

FOREIGN PATENT DOCUMENTS

JP      H10148427 A  *  6/1998
JP      H10174449 A  *  6/1998
(Continued)

OTHER PUBLICATIONS

Yamada et al., Inverter Control Device, Control Program and Control Method, Sep. 15, 2005, JP2005253268A, Whole Document (Year: 2005).*

(Continued)

*Primary Examiner* — Larry L Furdge
(74) *Attorney, Agent, or Firm* — Posz Law Group, PLC

(57) ABSTRACT

A motor drive apparatus includes a power converter including an inverter having an upper arm and a lower arm, the inverter being configured to control an operation of an electric motor, and a drive controller configured to apply a dead time for preventing a short circuit between the upper arm and the lower arm, and to control the power converter. The drive controller is configured to control the power converter by switching a first mode in which a first correction value representing a time used to correct a voltage drop due to the dead time is employed to control the power converter, and a second mode in which a second correction value smaller than the first correction value is employed to control the power converter.

5 Claims, 3 Drawing Sheets

(51) Int. Cl.
  F25B 47/02     (2006.01)
  H02P 27/08     (2006.01)
  H02P 27/06     (2006.01)
  F25B 49/02     (2006.01)

(52) U.S. Cl.
  CPC ............ *F25B 49/025* (2013.01); *H02P 27/06* (2013.01); *H02P 27/08* (2013.01); *H02P 27/085* (2013.01); *F25B 2313/006* (2013.01); *F25B 2500/05* (2013.01); *F25B 2600/01* (2013.01); *F25B 2600/021* (2013.01); *F25B 2700/151* (2013.01); *F25B 2700/1931* (2013.01); *F25B 2700/1933* (2013.01); *F25B 2700/21151* (2013.01); *F25B 2700/21152* (2013.01); *Y02B 30/70* (2013.01)

(56) References Cited

U.S. PATENT DOCUMENTS

| | | | | |
|---|---|---|---|---|
| 2004/0007999 | A1* | 1/2004 | Kushion | B62D 5/0463 318/442 |
| 2009/0113908 | A1* | 5/2009 | Hwang | F25B 49/025 62/228.1 |
| 2010/0039056 | A1 | 2/2010 | Kobayashi et al. | |
| 2011/0076161 | A1* | 3/2011 | Taguchi | F04B 27/1804 417/213 |
| 2013/0186111 | A1* | 7/2013 | Kim | F25B 49/022 62/56 |
| 2013/0305760 | A1* | 11/2013 | Shinomoto | F25B 49/025 62/238.7 |
| 2014/0376275 | A1* | 12/2014 | Ohashi | H02M 1/38 363/21.02 |

FOREIGN PATENT DOCUMENTS

| | | |
|---|---|---|
| JP | H10-191651 A | 7/1998 |
| JP | 2005-253268 A | 9/2005 |
| JP | 2005253268 A * | 9/2005 |
| JP | 2010104174 A * | 5/2010 |
| JP | 4786717 B2 | 7/2011 |
| JP | 2013-137146 A | 7/2013 |

OTHER PUBLICATIONS

Matsumoto et al., Heat Pump System, Jun. 2, 1998 JPH10148427A, Whole Document (Year: 1998).*
Boku, Dead Time Compensation for Compressor of Air Conditioner, Jun. 26, 1998, JPH10174449A, Whole Document (Year: 1998).*
Nakade, Device and Method for Driving Stepping Motor, May 6, 2010, JP2010104174A, Whole Document (Year: 2010).*
International Search Report of the International Searching Authority dated Jun. 30, 2015 for the corresponding International application No. PCT/JP2015/061393 (and English translation).

* cited by examiner

MOTOR DRIVE APPARATUS AND REFRIGERATION CYCLE APPARATUS

CROSS REFERENCE TO RELATED APPLICATION

This application is a U.S. national stage application of PCT/JP2015/061393 filed on Apr. 13, 2015, the contents of which are incorporated herein by reference.

TECHNICAL FIELD

The present invention relates to a motor drive apparatus that controls an operation of a compressor, and a refrigeration cycle apparatus including the motor drive apparatus.

BACKGROUND ART

Refrigeration cycle apparatuses such as an air-conditioning apparatus and a refrigerating and air-conditioning apparatus include a compressor driven by an electric motor, for example, a DC brushless motor. The DC brushless motor is controlled by a motor drive apparatus including a converter and an inverter, through a pulse width modulation (PWM) control. Through the PWM control, an AC load is driven, in accordance with a voltage command, with an AC voltage generated by switching operations performed by a power device element provided in the output stage and having an upper arm and a lower arm. In the control, a dead time Td, during which the upper arm and the lower arm are both turned off, is provided to prevent a short circuit caused by turning on the upper arm and the lower arm at the same time in the power device element. However, the presence of the dead time Td causes an error between a voltage value of a voltage command and an actual output voltage value.

To solve the problem, a dead time correction control is performed to correct the voltage error occurring due to the dead time Td. In the dead time correction control, current detectors provided in the motor drive apparatus detect a current of the output phase, a correction value Tdh for correcting the difference between the voltage value of the voltage command and the actual output voltage value is generated on the basis of the detected current, and a voltage is output. In the voltage correction by the dead time correction control, the polarity of the current of the output phase is detected, a voltage of a positive polarity is output when the current has a positive polarity, and a voltage of a negative polarity is output when the current has a negative polarity.

However, when the load to which the voltage is output is light, in other words, when the output current is small, the current of the output phase has narrow amplitude. Consequently, the current oscillates in the vicinity of the zero cross point at which the polarity is switched, and hence it is difficult to accurately detect the polarity of the current. In addition, in the vicinity of the zero cross point, the polarity of the current frequently changes, owing to variation of the parts of the current detectors, variation in temperature, a temperature noise, the switching in the PWM control, and other factors. Consequently, the polarity of the voltage to be corrected may be erroneously detected and a reverse correction may be performed to increase the error of the output voltage.

To address such an issue of the dead time correction control arising when the output current is small and fluctuates in the vicinity of the zero cross point, Patent Literature 1 discloses a power converter that calculates a zero cross timing at which the zero cross lies, on the basis of the output current value and the output frequency of each phase, and varies the voltage for the dead time correction by using the zero cross timing. In addition, Patent Literature 2 discloses an air-conditioning apparatus that calculates the zero cross phase by using an average value of the timings, at which the zero cross lies, measured a plurality of times on the basis of the detected current, and determines the polarity for performing the dead time correction control.

CITATION LIST

Patent Literature

Patent Literature 1: Japanese Patent No. 4786717
Patent Literature 2: Japanese Unexamined Patent Application Publication No. 10-191651

SUMMARY OF INVENTION

Technical Problem

According to Patent Literature 1 and Patent Literature 2, however, the polarity is determined through the detection of the current of the output phase. With such determination, high-precision parts have to be employed to eliminate effects of variation, among production lots, of the detection parts used in the current detectors, variation in temperature, and other factors. However, reduction is desired in cost of the current detectors employed in the refrigeration cycle apparatus, and therefore it is difficult to use the high-precision parts, which are expensive.

The present invention has been accomplished in view of the foregoing situation, and provides a motor drive apparatus that reduces the reverse correction in the dead time correction process at a low cost, and a refrigeration cycle apparatus including such a motor drive apparatus.

Solution to Problem

A motor drive apparatus of an embodiment of the present invention includes a power converter including an inverter having an upper arm and a lower arm, the inverter being configured to control an operation of an electric motor, and a drive controller configured to apply a dead time for preventing a short circuit between the upper arm and the lower arm and to control the power converter. The drive controller is configured to control the power converter by switching a first mode in which a first correction value representing a time used to correct a voltage drop due to the dead time is employed to control the power converter, and a second mode in which a second correction value smaller than the first correction value is employed to control the power converter.

Advantageous Effects of Invention

According to an embodiment of the present invention, the drive controller switches the first mode in which the first correction value is employed to control the power converter, and the second mode in which the second correction value smaller than the first correction value is employed to control the power converter. Consequently, the reverse correction in the dead time correction process can be reduced by utilizing the second mode when the output current oscillates in the vicinity of the zero cross point. In addition, a current detected by current detectors is not employed for switching the dead time correction. Consequently, the reverse correction in the dead time correction process can be reduced at a low cost.

DESCRIPTION OF EMBODIMENTS

Figure 1:
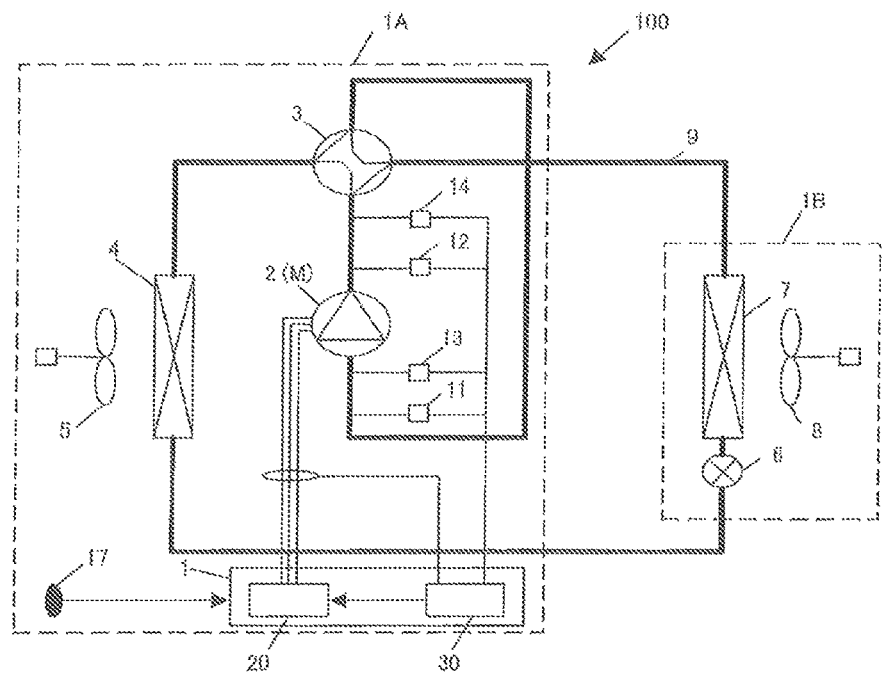
FIG. 1 is a circuit diagram of a refrigeration cycle apparatus 100 according to Embodiment 1 of the present invention.

Hereinafter, Embodiments of a motor drive apparatus 1 and a refrigeration cycle apparatus 100 according to the present invention will be described with reference to the drawings. The present invention is not limited to Embodiments described below. In FIG. 1 and other drawings, dimensional relationships among the components may differ from the actual relationships.

Embodiment 1

FIG. 1 is a circuit diagram of the refrigeration cycle apparatus 100 according to Embodiment 1 of the present invention. With reference to FIG. 1, the refrigeration cycle apparatus 100 will be described. As shown in FIG. 1, the refrigeration cycle apparatus 100 includes a refrigerant circuit 9 composed of a compressor 2, a first heat exchanger 4, an expansion unit 6, and a second heat exchanger 7 that are connected via pipes to allow refrigerant to circulate, and a motor drive apparatus 1. The refrigeration cycle apparatus 100 also includes, for example, a flow switching device 3, an outdoor fan 5, an indoor fan 8, a suction pressure detector 11, a discharge pressure detector 12, a suction temperature detector 13, a discharge temperature detector 14, and an operation commander 17.

The refrigeration cycle apparatus 100 includes an outdoor unit 1A and an indoor unit 1B. The outdoor unit 1A includes the compressor 2, the flow switching device 3, the first heat exchanger 4, the outdoor fan 5, the suction pressure detector 11, the discharge pressure detector 12, the suction temperature detector 13, the discharge temperature detector 14, the operation commander 17, and the motor drive apparatus 1. The indoor unit 1B includes the expansion unit 6, the second heat exchanger 7, and the indoor fan 8. The refrigeration cycle apparatus 100 may be exemplified by an air-conditioning apparatus, a refrigerating and air-conditioning apparatus, or a similar apparatus.

The compressor 2 is driven by an electric motor and compresses the refrigerant. The flow switching device 3 switches the flow direction of the refrigerant in the refrigerant circuit 9 and thus allows a cooling operation and a heating operation to be performed. The first heat exchanger 4 exchanges heat, for example, between outdoor air and the refrigerant. The outdoor fan 5 supplies outdoor air to the first heat exchanger 4. The expansion unit 6 expands the refrigerant and reduces the pressure of the refrigerant. The second heat exchanger 7 exchanges heat, for example, between indoor air and the refrigerant. The indoor fan 8 supplies indoor air to the second heat exchanger 7.

The suction pressure detector 11 detects a suction pressure Ps of the refrigerant being sucked into the compressor 2. The discharge pressure detector 12 detects a discharge pressure Pd of the refrigerant discharged from the compressor 2. The suction temperature detector 13 detects a temperature of the refrigerant being sucked into the compressor 2. The discharge temperature detector 14 detects a temperature of the refrigerant discharged from the compressor 2. The operation commander 17 transmits an operation command to the compressor 2 through the motor drive apparatus 1. The operation command includes, for example, an operation mode of the refrigeration cycle apparatus 100, an operation frequency of the compressor 2, and other factors. Examples of the operation mode of the refrigeration cycle apparatus 100 include the cooling operation, the heating operation, and a defrosting operation.

Although Embodiment 1 refers to the case where one indoor unit 1B is connected to one outdoor unit 1A, about one to one hundred indoor units 1B may be connected to one outdoor unit 1A. In this case, a load for operating the outdoor unit 1A is adjusted depending on the operation mode of each of the indoor units 1B. Then, the operation commander 17 transmits the adjustment result to the motor drive apparatus 1 to attain a highly efficient operation. The operation commander 17 also performs maintenance work to facilitate the indoor unit 1B and the outdoor unit 1A to work appropriately, in addition to the operation control of each indoor unit 1B. The operation commander 17 transmits, for example, an instruction to perform the defrosting operation to prevent frost formation on the first heat exchanger 4 when the outdoor temperature is low, or similar operations, and thus to prevent degradation in operation efficiency.

The motor drive apparatus 1 includes a power converter 20 and a drive controller 30. The power converter 20 controls the operation of the compressor 2 (electric motor). The drive controller 30 receives inputs of the suction pressure detected by the suction pressure detector 11, the discharge pressure detected by the discharge pressure detector 12, the suction temperature detected by the suction temperature detector 13, and the discharge temperature detected by the discharge temperature detector 14. The drive controller 30 controls the power converter 20 on the basis of the mentioned detection results.

Figure 2:
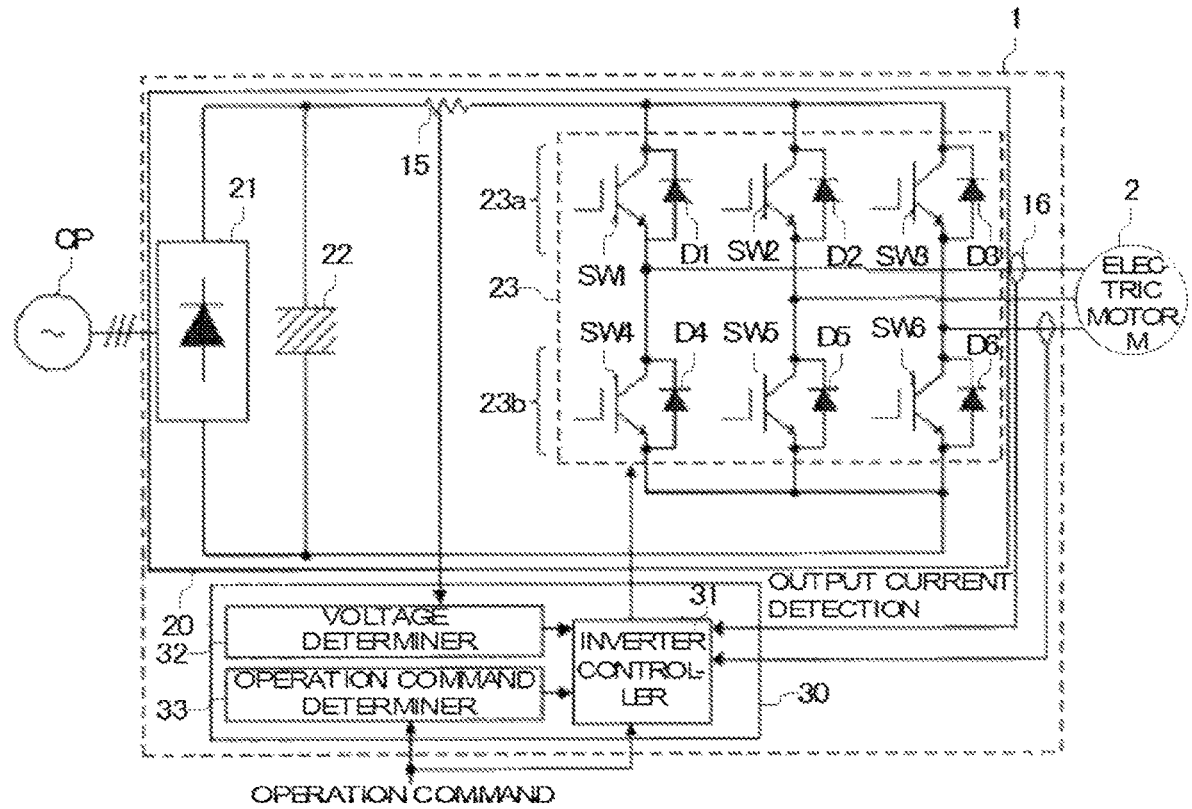
FIG. 2 is a circuit diagram of a motor drive apparatus 1 according to Embodiment 1 of the present invention.

FIG. 2 is a circuit diagram of the motor drive apparatus 1 according to Embodiment 1 of the present invention. As shown in FIG. 2, the motor drive apparatus 1 includes a voltage detector 15 and current detectors 16. The voltage detector 15 is provided in the power converter 20 and detects a voltage Vdc of the power converter 20. The current detectors 16 detect a current output to the compressor 2.

The power converter 20 includes a converter 21, a capacitor 22, and an inverter 23. The converter 21 converts an AC voltage applied by an AC power source to a DC voltage, and is made of, for example, a power semiconductor such as free wheeling diode (FWD). The AC power source may be of a three-phase three-wire system, or a three-phase four-wire system. The capacitor 22 smoothes the DC voltage converted by the converter 21. The current detectors 16 are provided in the power converter 20 and detect a current output from the inverter 23.

The inverter 23 outputs an AC voltage through pulse width modulation of the DC voltage to control the operation of the compressor 2, and is constituted of a power semiconductor in which, for example, silicon, silicon carbide, or gallium nitride is used as material. The inverter 23 includes an upper arm 23a and a lower arm 23b.

The upper arm 23a includes a first switching element SW1, a second switching element SW2, a third switching element SW3, a first diode D1, a second diode D2, and a third diode D3. The first diode D1 is connected in parallel to the first switching element SW1, the second diode D2 is connected in parallel to the second switching element SW2, and the third diode D3 is connected in parallel to the third switching element SW3.

The lower arm 23b includes a fourth switching element SW4, a fifth switching element SW5, a sixth switching element SW6, a fourth diode D4, a fifth diode D5, and a sixth diode D6. The fourth diode D4 is connected in parallel to the fourth switching element SW4, the fifth diode D5 is connected in parallel to the fifth switching element SW5, and the sixth diode D6 is connected in parallel to the sixth switching element SW6.

The drive controller 30 includes an inverter controller 31, a voltage determiner 32, and an operation command determiner 33. The inverter controller 31 controls the inverter 23 on the basis of the operation command input from the operation commander 17 and the current detected by the current detectors 16. The voltage determiner 32 determines the voltage Vdc detected by the voltage detector 15, and transmits the determined information to the inverter controller 31. The operation command determiner 33 determines the operation command input from the operation commander 17, and transmits the determined information to the inverter controller 31.

A dead time Td will be described below. The motor of the compressor 2 is controlled by the motor drive apparatus 1 through a PWM control. The PWM control represents control, in accordance with a voltage command, to drive the compressor 2 with an AC voltage generated by switching operations performed by the inverter 23 having the upper arm 23a and the lower arm 23b. If a short circuit is caused by supplying a current to the upper arm 23a and the lower arm 23b at the same time in the PWM control, the current is not supplied to the compressor 2 but instead an excessive current runs through the motor drive apparatus 1 and, as a result, the first switching element SW1 to the sixth switching element SW6 as well as other parts may be damaged. To prevent such an accident, the dead time Td is applied in the drive controller 30 of the motor drive apparatus 1, the dead time Td being a period during which the upper arm 23a and the lower arm 23b are both turned off.

A dead time correction control will be described below. The presence of the dead time Td causes an error between a voltage value of the voltage command and an actual output voltage value. Consequently, the dead time correction control is performed to correct the error of the voltage due to the dead time Td. In the dead time correction control, the current detectors 16 provided in the motor drive apparatus 1 detect a current of the output phase, and a correction value for correcting the difference between the voltage value of the voltage command and the actual output voltage value is generated on the basis of the detected current, to output a voltage. In the voltage correction by the dead time correction control, the polarity of the current of the output phase is detected to output a voltage of a positive polarity when the current has a positive polarity or output a voltage of a negative polarity when the current has a negative polarity.

However, when the load to which the voltage is output is light, in other words, when the output current is small, the current of the output phase has narrow amplitude. Consequently, the current oscillates in the vicinity of the zero cross point at which the polarity is switched, and hence it is difficult to accurately detect the polarity of the current. In addition, in the vicinity of the zero cross point, the polarity of the current frequently changes owing to variation of the parts of the current detectors 16, variation in temperature, a temperature noise, the switching in the PWM control, and other factors. Consequently, a reverse correction may be performed to increase the error of the output voltage, because of erroneous detection of the polarity of the voltage to be corrected.

Further, when the voltage of the motor drive apparatus 1 is low, the effect of the reverse correction due to the dead time Td is not serious; however, when the voltage of the motor drive apparatus 1 is high, the effect of the reverse correction is serious.

In Embodiment 1, in contrast, the dead time Td is applied in the drive controller 30 for preventing a short circuit between the upper arm 23a and the lower arm 23b, and the drive controller 30 switches the first mode and the second mode to control the power converter 20. In the first mode, a first correction value Tdh1, which represents a time for correcting a voltage drop due to the dead time Td, is employed to control the power converter 20. In the second mode, a second correction value Tdh2 smaller than the first correction value Tdh1 is employed to control the power converter 20. The first correction value Tdh1 and the second correction value Tdh2 each represent the time for correcting the voltage of a period corresponding to the dead time Td. As described above, in Embodiment 1, the two values, namely the first correction value Tdh1 and the second correction value Tdh2, are employed as the dead time correction value.

The first mode is performed when the compressor 2 has a normal load equal to or larger than a threshold load. The second mode is performed when the compressor 2 has a light load smaller than the threshold load, or when the refrigeration cycle apparatus 100 is performing the defrosting operation. The drive controller 30 switches from the first mode to the second mode, when the compressor 2 has a light load. The operation commander 17 of the refrigeration cycle apparatus 100 sets, in advance, the compressor 2 to operate with the light load. Likewise, the drive controller 30 switches from the first mode to the second mode, when the defrosting operation is performed. The defrosting operation is set in advance by the operation commander 17 of the refrigeration cycle apparatus 100.

An operation of the refrigeration cycle apparatus 100 according to Embodiment 1 will be described below. First, the cooling operation will be described. The compressor 2 sucks and compresses the refrigerant and discharges the refrigerant in a form of high-temperature and high-pressure gas. The discharged refrigerant flows into the first heat exchanger 4 after passing through the flow switching device 3, and the first heat exchanger 4 condenses the refrigerant through heat exchange with outdoor air. The condensed refrigerant flows into the expansion unit 6, which expands the condensed refrigerant and reduces the pressure of the refrigerant. The refrigerant with the reduced pressure flows into the second heat exchanger 7, which evaporates the refrigerant through heat exchange with indoor air. At this time, the indoor air is cooled, so that the room is cooled. The refrigerant, which has turned into high-temperature and low-pressure gas through evaporation, is sucked into the compressor 2 after passing through the flow switching device 3.

The heating operation will be described below. The compressor 2 sucks and compresses the refrigerant and discharges the refrigerant in the form of high-temperature and high-pressure gas. The discharged refrigerant flows into the second heat exchanger 7 after passing through the flow switching device 3, and the second heat exchanger 7 condenses the refrigerant through heat exchange with indoor air. At this time, the indoor air is heated, so that the room is heated. The condensed refrigerant flows into the expansion unit 6, which expands the condensed refrigerant and reduces the pressure of the refrigerant. The refrigerant with the reduced pressure flows into the first heat exchanger 4, which evaporates the refrigerant through heat exchange with outdoor air. The refrigerant, which has turned into high-temperature and low-pressure gas through evaporation, is sucked into the compressor 2 after passing through the flow switching device 3.

The defrosting operation will be described below. The compressor 2 sucks and compresses the refrigerant and discharges the refrigerant in the form of high-temperature and high-pressure gas. The discharged refrigerant flows into the first heat exchanger 4 after passing through the flow switching device 3. At this time, the frost stuck to the first heat exchanger 4 is melted by the high-temperature and high-pressure refrigerant. The first heat exchanger 4 condenses the refrigerant through heat exchange with outdoor air. The condensed refrigerant flows into the expansion unit 6, which expands the condensed refrigerant and reduces the pressure of the refrigerant. The refrigerant with the reduced pressure flows into the second heat exchanger 7, which evaporates the refrigerant through heat exchange with indoor air. The refrigerant, which has turned into high-temperature and low-pressure gas through evaporation, is sucked into the compressor 2 after passing through the flow switching device 3.

Figure 3:
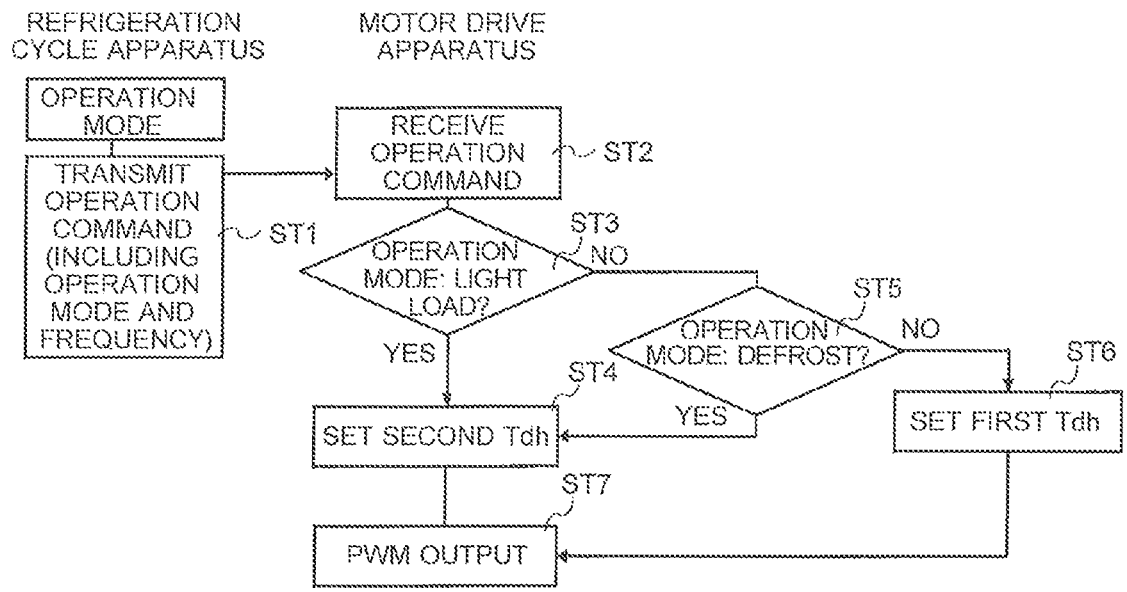
FIG. 3 is a flowchart showing an operation of the motor drive apparatus 1 according to Embodiment 1 of the present invention.

FIG. 3 is a flowchart showing an operation of the motor drive apparatus 1 according to Embodiment 1 of the present invention. An operation of the motor drive apparatus 1 according to Embodiment 1 will be described. Here, the motor drive apparatus 1 is assumed to be controlling the power converter 20 in the first mode. Also, a case is assumed where the first correction value Tdh1 is 1.5 μs and the second correction value Tdh2 is 0.4 μs. With the first correction value Tdh1 of 1.5 μs, for example, the voltage increases by an amount corresponding to 1.5 μs, each time the dead time Td is applied. With the second correction value Tdh2 of 0.4 μs, the voltage increases by an amount corresponding to 0.4 μs, each time the dead time Td is applied. That is, the second correction value Tdh2, which is smaller than the first correction value Tdh1, provides a smaller increase of the voltage than the first correction value Tdh1 does.

With reference to FIG. 3, first the operation commander 17 transmits an operation command including the operation mode of the refrigeration cycle apparatus 100 to the motor drive apparatus 1 (step ST1). When the motor drive apparatus 1 receives the operation command (step ST2), it is determined whether the operation mode is an operation with a light load or not (step ST3). When the operation mode is the operation with a light load (YES at step ST3), the first mode is switched to the second mode at step ST4. Then the operation proceeds to step ST7.

When the operation mode is not the operation with a light load (NO at step ST3), it is determined whether the operation mode is the defrosting operation (step ST5). When the operation mode is the defrosting operation (YES at step ST5), the first mode is switched to the second mode at step ST4. When the operation mode is not the defrosting operation (NO at step ST5), the first mode is maintained (step ST6). Then, the operation proceeds to step ST7, where the PWM control is performed (voltage is output).

More specifically, the first correction value Tdh1 is employed, for example, at the time of activation of the refrigeration cycle apparatus 100 and during a normal operation, and the second correction value Tdh2 is employed, for example, during the operation with a light load or the defrosting operation. When the operation with the light load or the defrosting operation is switched to the normal operation, the first correction value Tdh1 is employed.

The advantageous effects of the motor drive apparatus according to Embodiment 1 will be described below. The drive controller 30 switches the first mode in which the first correction value Tdh1 for correcting a voltage drop due to the dead time Td is employed to control the power converter 20, and the second mode in which the second correction value Tdh2 smaller than the first correction value Tdh1 is employed to control the power converter 20. Such an arrangement enables reduction of the reverse correction in the dead time correction process, by employing the second mode when the output current oscillates in the vicinity of the zero cross point.

In addition, the two values, namely the first correction value Tdh1 and the second correction value Tdh2, are employed as the dead time correction value in Embodiment 1. Techniques disclosed according to the related art include linearly changing the dead time correction value on the basis of a current output to the electric motor. In such a technique, as the dead time correction value is linearly changed, the output current has to be detected even when the output current is extremely small, and hence highly accurate current detectors are required. In Embodiment 1, in contrast, only the two values, namely the first correction value Tdh1 and the second correction value Tdh2, are employed as the dead time correction value. Such an arrangement eliminates the need to detect the output current, when the output current is extremely small. Consequently, the reverse correction in the dead time correction process can be reduced at a low cost.

For example, when the load is heavy, or when the cooling operation or heating operation is being performed, high-efficiency operation can be attained by performing the first mode using the first correction value Tdh1.

The drive controller 30 switches from the first mode to the second mode, when the compressor 2 has a light load. The second mode based on the second correction value Tdh2 is performed in such a case where the compressor 2 has a light load and hence only small energy is required for operation, and consequently an effect on the operation efficiency is not significant.

Further, the refrigeration cycle apparatus 100 includes the refrigerant circuit 9 including the compressor 2, the first heat exchanger 4, the expansion unit 6, and the second heat exchanger 7 that are connected via the pipes to allow the refrigerant to circulate, and the motor drive apparatus 1. In addition, the refrigeration cycle apparatus 100 is configured to perform the defrosting operation for removing frost from the first heat exchanger 4, and the drive controller 30 switches from the first mode to the second mode, when the defrosting operation is being performed. Thus, the second mode based on the second correction value Tdh2 is performed when only small energy is required for operation, for example, during the defrosting operation, and consequently an effect on the operation efficiency is not significant.

Embodiment 2

The motor drive apparatus 1 according to Embodiment 2 of the present invention will be described below. Embodiment 2 is different from Embodiment 1 in that the second correction value Tdh2 is set to zero. The components of Embodiment 2 same as those of Embodiment 1 will be given the same reference signs and the description of the components will not be repeated. The description given below will be focused on differences from Embodiment 1.

As mentioned above, the second correction value Tdh2 is set to zero in the motor drive apparatus 1. Consequently, the effect on the operation efficiency is further reduced when the second mode is performed, in addition to the advantages provided by Embodiment 1. Consequently, the reverse correction in the dead time correction process can be more effectively reduced.

Embodiment 3

Figure 4:
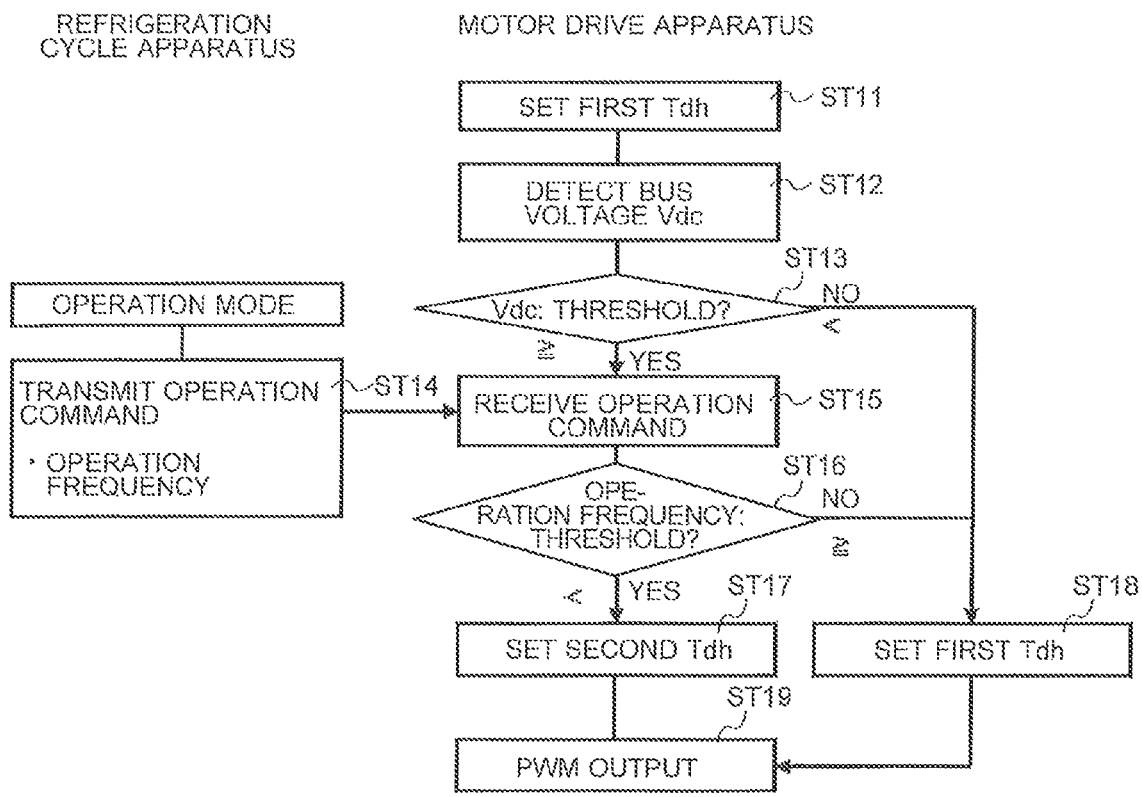
FIG. 4 is a flowchart showing an operation of the motor drive apparatus 1 according to Embodiment 3 of the present invention.

The motor drive apparatus 1 according to Embodiment 3 of the present invention will be described below. FIG. 4 is a flowchart showing an operation of the motor drive apparatus 1 according to Embodiment 3 of the present invention. Embodiment 3 is different from Embodiment 1 in that the operation mode is switched between the first mode and the second mode on the basis of the voltage Vdc of the power converter 20 and the operation frequency of the compressor 2. The components of Embodiment 3 same as those of Embodiments 1 and 2 will be given the same reference signs and the description of the components will not be repeated. The description given below will be focused on differences from Embodiments 1 and 2.

In Embodiment 3, the drive controller 30 switches from the first mode to the second mode when the voltage Vdc detected by the voltage detector 15 is equal to or higher than a threshold voltage. The drive controller 30 switches from the first mode to the second mode, also when the operation frequency of the compressor 2 is lower than a threshold frequency.

A case is assumed where the first correction value Tdh1 is 1.5 µs and the second correction value Tdh2 is 0.4 µs. With the first correction value Tdh1 of 1.5 µs, for example, the voltage increases by an amount corresponding to 1.5 µs, each time the dead time Td is applied. Also, a case is assumed where the threshold voltage is 650 V and the threshold frequency is 30 rps.

With reference to FIG. 4, the first mode based on the first correction value Tdh1 is set (step ST11). Then, the voltage detector 15 detects the voltage Vdc of the power converter 20 (step ST12). The drive controller 30 then determines whether the voltage Vdc detected by the voltage detector 15 is equal to or higher than the threshold voltage (step ST13). When the voltage Vdc detected by the voltage detector 15 is lower than the threshold voltage (NO at step ST13), the first mode is maintained (step ST18), and the operation proceeds to step ST19. When the voltage Vdc detected by the voltage detector 15 is equal to or higher than the threshold voltage (YES at step ST13), the operation proceeds to step ST15.

The operation commander 17 transmits the operation command including the operation frequency of the compressor 2, to the motor drive apparatus 1 (step ST14). When the motor drive apparatus 1 receives the operation command (step ST15), it is determined whether the operation frequency of the compressor 2 is lower than the threshold frequency (step ST16). When the operation frequency of the compressor 2 is equal to or higher than the threshold frequency (NO at step ST16), the first mode is maintained (step ST18), and the operation proceeds to step ST19. When the operation frequency of the compressor 2 is lower than the threshold frequency (YES at step ST16), the first mode is switched to the second mode (step ST17). Then the operation proceeds to step ST19, where the PWM control is performed (voltage is output).

As described above, in Embodiment 3, the second mode is performed when the voltage is high and the operation frequency is low. Consequently, the reverse correction in the dead time correction process can be reduced.

In addition, the motor drive apparatus 1 includes the voltage detector 15 provided in the power converter 20 and configured to detect the voltage Vdc of the power converter 20, and the drive controller 30 switches from the first mode to the second mode when the voltage Vdc detected by the voltage detector 15 is equal to or higher than the threshold voltage. When the voltage is high, an effect on the operation efficiency is significant when the reverse correction occurs in the dead time correction control. In Embodiment 3, however, the second mode based on the second correction value Tdh2 is performed when the voltage is high, and consequently the effect on the operation efficiency is not significant.

Further, the drive controller 30 switches from the first mode to the second mode, when the operation frequency of the compressor 2 is lower than the threshold frequency. The second mode based on the second correction value Tdh2 is performed in such a case where the operation frequency of the compressor 2 is low, in other words, when the load is light, and consequently the effect on the operation efficiency is not significant.

The transition to the second mode may be performed only on the basis of the voltage Vdc detected by the voltage detector 15 or only on the basis of the operation frequency of the compressor 2. In addition, as in Embodiment 2, the second correction value Tdh2 may be set to zero also in Embodiment 3. In this case, the effect on the operation efficiency is further reduced when the second mode is performed. Consequently, the reverse correction in the dead time correction process can be more effectively reduced.

Embodiment 4

Figure 5:
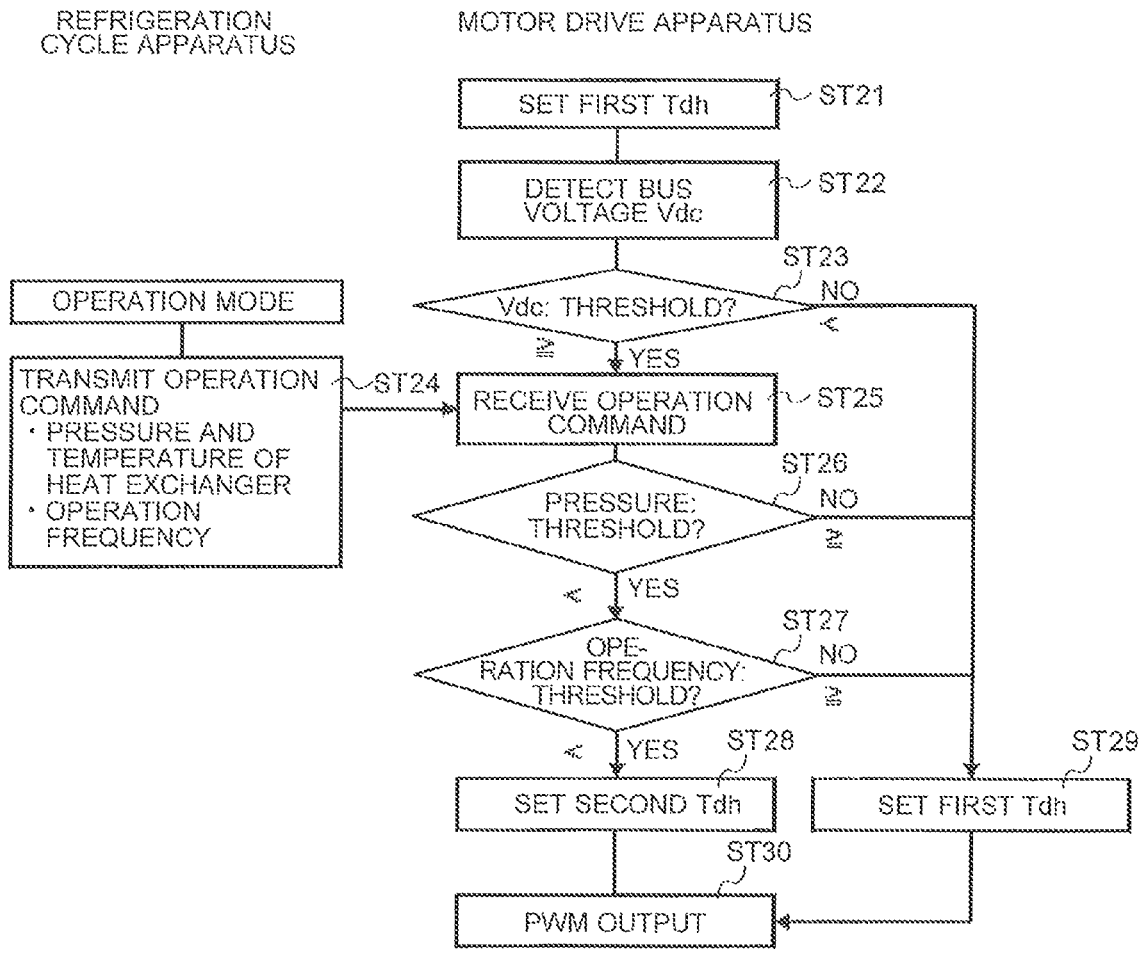
FIG. 5 is a flowchart showing an operation of the motor drive apparatus 1 according to Embodiment 4 of the present invention.

The motor drive apparatus 1 according to Embodiment 4 of the present invention will be described below. FIG. 5 is a flowchart showing an operation of the motor drive apparatus 1 according to Embodiment 4 of the present invention. Embodiment 4 is different from Embodiment 3 in that the operation mode is switched between the first mode and the second mode on the basis of the suction pressure and the discharge pressure. The components of Embodiment 4 same as those of Embodiments 1, 2, and 3 will be given the same reference signs and the description of the components will not be repeated. The description given below will be focused on differences from Embodiments 1, 2, and 3.

In Embodiment 4, the drive controller 30 switches from the first mode to the second mode, when the suction pressure detected by the suction pressure detector 11 is lower than a threshold suction pressure, and when the discharge pressure detected by the discharge pressure detector 12 is lower than a threshold discharge pressure. In Embodiment 4, the pressure in the first heat exchanger 4 is substantially grasped on the basis of the detected suction pressure and the detected discharge pressure.

In FIG. 5, step ST21 to step ST23 are the same as step ST11 to step ST13 of Embodiment 3. As shown in FIG. 5, at step ST24, the operation commander 17 transmits the operation command including the pressure (suction pressure and discharge pressure of compressor 2) and the temperature in the first heat exchanger 4, and the operation frequency of the compressor 2, to the motor drive apparatus 1. When the motor drive apparatus 1 receives the operation command (step ST25), it is determined whether the suction pressure is lower than the threshold suction pressure and it is determined whether the discharge pressure is lower than the threshold discharge pressure (step ST26). When the suction pressure is equal to or higher than the threshold suction pressure and the discharge pressure is equal to or higher than the threshold discharge pressure (NO at step ST26), the first mode is maintained (step ST29), and the operation proceeds to step ST30. When the suction pressure is lower than the threshold suction pressure and the discharge pressure is lower than the threshold discharge pressure (YES at step ST26), the operation proceeds to step ST27. Step ST27 to step ST30 are the same as step ST16 to step ST19 in Embodiment 3.

In Embodiment 4, as described above, the first mode is performed when the pressure in the first heat exchanger 4 is high (when suction pressure and discharge pressure of the compressor 2 are high). Consequently, such an arrangement reduces unnecessary restriction on the dead time correction control due to excessive use of the second correction value Tdh2. In other words, as the operation mode is switched between the first mode and the second mode on the basis of the pressure in the first heat exchanger 4 (suction pressure and discharge pressure of the compressor 2) in Embodiment 4, the operation based on the first correction value Tdh1 is performed over a broader range. Consequently, the high-efficiency operation can be performed over a broader range.

As described above, the refrigeration cycle apparatus 100 includes the suction pressure detector 11 that detects the suction pressure of the refrigerant being sucked into the compressor 2 and the discharge pressure detector 12 that detects the discharge pressure of the refrigerant discharged from the compressor 2, and the drive controller 30 switches from the first mode to the second mode, when the suction pressure detected by the suction pressure detector 11 is lower than the threshold suction pressure and when the discharge pressure detected by the discharge pressure detector 12 is lower than the threshold discharge pressure. In Embodiment 4, consequently, the high-efficiency operation can be performed over a broader range.

The transition to the second mode may be performed only on the basis of the suction pressure and the discharge pressure of the compressor 2. The transition to the second mode may be performed on the basis of any one of the suction pressure and the discharge pressure of the compressor 2. Further, as in Embodiment 2, the second correction value Tdh2 may be set to zero also in Embodiment 4. In this case, the effect on the operation efficiency is further reduced when the second mode is performed. Consequently, the reverse correction in the dead time correction process can be more effectively reduced.

Embodiment 5

Figure 6:
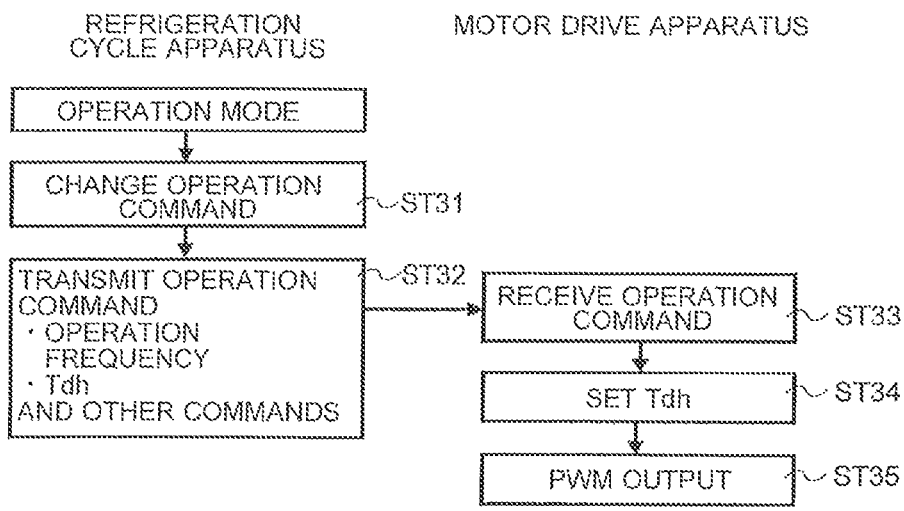
FIG. 6 is a flowchart showing an operation of the motor drive apparatus 1 according to Embodiment 5 of the present invention.

The motor drive apparatus 1 according to Embodiment 5 of the present invention will be described below. FIG. 6 is a flowchart showing an operation of the motor drive apparatus 1 according to Embodiment 5 of the present invention. Embodiment 5 is different from Embodiment 1 in that the operation commander 17 switches from the first mode to the second mode on the basis of the operation mode of the refrigerant circuit 9. The components of Embodiment 5 same as those of Embodiments 1, 2, 3, and 4 will be given the same reference signs and the description of the components will not be repeated. The description given below will be focused on differences from Embodiments 1, 2, 3, and 4.

In Embodiment 5, the operation commander 17 of the refrigeration cycle apparatus 100, instead of the drive controller 30 of the motor drive apparatus 1, switches from the first mode to the second mode.

With reference to FIG. 6, first the operation commander 17 switches the first mode and the second mode on the basis of the operation mode of the refrigeration cycle apparatus 100 (step ST31). Then, the operation commander 17 transmits the operation command including one or more of the operation frequency of the compressor 2, the first correction value Tdh1, and the second correction value Tdh2, to the motor drive apparatus 1 (step ST32). When the motor drive apparatus 1 receives the operation command (step ST33), one of the first correction value Tdh1 and the second correction value Tdh2 is selected in the motor drive apparatus 1 (step ST34). Then, the operation proceeds to step ST35, where the PWM control is performed (voltage is output).

In Embodiment 5, the refrigeration cycle apparatus 100 includes the refrigerant circuit 9 including the compressor 2, the first heat exchanger 4, the expansion unit 6, and the second heat exchanger 7 that are connected via the pipes to allow the refrigerant to circulate, the motor drive apparatus 1 that controls the operation of the compressor 2, and the operation commander 17 that transmits the operation command to the compressor 2. The motor drive apparatus 1 includes the power converter 20 including the inverter 23 having the upper arm 23a and the lower arm 23b, the inverter 23 being configured to control the operation of the compressor 2, and the drive controller 30 that controls the power converter 20 and is configured to apply the dead time Td for preventing a short circuit between the upper arm 23a and the lower arm 23b. The drive controller 30 is configured to perform the first mode in which the first correction value Tdh1 representing a time used to correct the voltage drop due to the dead time Td is employed to control the power converter 20 and the second mode in which the second correction value Tdh2 smaller than the first correction value Tdh1 is employed to control the power converter 20, and the operation commander 17 switches from the first mode to the second mode on the basis of the operation mode of the refrigerant circuit 9.

As described above, the operation commander 17 transmits the first correction value Tdh1 or the second correction value Tdh2 to the motor drive apparatus 1 at the same time when, for example, the operation mode of the refrigeration cycle apparatus 100 is changed. Such an arrangement eliminates the need for the motor drive apparatus 1 to switch the first mode and the second mode. Consequently, the burden on the motor drive apparatus 1 can be reduced.

REFERENCE SIGNS LIST

1: motor drive apparatus, 1A: outdoor unit, 1B: indoor unit, 2: compressor (electric motor), 3: flow switching device, 4: first heat exchanger, 5: outdoor fan, 6: expansion unit, 7: second heat exchanger, 8: indoor fan, 9: refrigerant circuit, 11: suction pressure detector, 12: discharge pressure detector, 13: suction temperature detector, 14: discharge temperature detector, 15: voltage detector, 16: current detector, 17: operation commander, 20: power converter, 21: converter, 22: capacitor, 23: inverter, 23a: upper arm, 23b:

lower arm, 30: drive controller, 31: inverter controller, 32: voltage determiner, 33: operation command determiner, SW1: first switching element, SW2: second switching element, SW3: third switching element, SW4: fourth switching element, SW5: fifth switching element, SW6: sixth switching element, D1: first diode, D2: second diode, D3: third diode, D4: fourth diode, D5: fifth diode, D6: sixth diode, 100: refrigeration cycle apparatus

The invention claimed is:

1. A motor drive apparatus comprising:
   a power converter including an inverter having an upper arm and a lower arm, the inverter being configured to control an operation of an electric motor;
   a drive controller configured to apply a dead time for preventing a short circuit between the upper arm and the lower arm and to control the power converter; and
   a voltage detector provided in the power converter and configured to detect a voltage of the power converter,
   the drive controller being configured to control the power converter by switching
      a first mode in which a first correction value representing a time used to correct a voltage drop due to the dead time is employed to control the power converter, and
      a second mode in which a second correction value smaller than the first correction value is employed to control the power converter,
   the drive controller being further configured to
      enter the first mode,
      set an operational frequency of the electric motor,
      determine whether the operational frequency of the electric motor is lower than a threshold frequency,
      maintain the first mode when the operational frequency of the electric motor is not lower than the threshold frequency, and
      switch from the first mode to the second mode when the operation frequency of the electric motor is lower than the threshold frequency,
   wherein the dead time is a time period during which the upper arm and the lower arm are both turned off.

2. The motor drive apparatus of claim 1, wherein the second correction value is set to zero.

3. A refrigeration cycle apparatus comprising:
   a refrigerant circuit including a compressor driven by the electric motor, a first heat exchanger, and a second heat exchanger that are connected via a pipe to allow refrigerant to circulate, wherein refrigerant pressure is reduced between the first heat exchanger and the second heat exchanger; and
   the motor drive apparatus of claim 1.

4. The refrigeration cycle apparatus of claim 3,
   wherein the refrigeration cycle apparatus is configured to perform a defrosting operation for removing frost from the first heat exchanger, and
   wherein the drive controller is further configured to
      determine whether the refrigeration cycle apparatus is performing the defrost operation, and
      switch from the first mode to the second mode, when at least one of conditions that the voltage detected by the voltage detector is equal to or higher than the threshold voltage, that the operation frequency of the electric motor is lower than the threshold frequency, or that the defrosting operation is being performed, is satisfied.

5. The refrigeration cycle apparatus of claim 4, further comprising:
   a suction pressure detector configured to detect a suction pressure of the refrigerant being sucked into the compressor; and
   a discharge pressure detector configured to detect a discharge pressure of the refrigerant discharged from the compressor,
   wherein the drive controller is further configured to
      determine whether the suction pressure of the electric motor is lower than a threshold suction pressure,
      determine whether the discharge pressure of the electric motor is lower than a threshold discharge pressure, and
      switch from the first mode to the second mode, when at least one of conditions that the voltage detected by the voltage detector is equal to or higher than the threshold voltage, that the operation frequency of the electric motor is lower than the threshold frequency, that the defrosting operation is being performed, that the suction pressure detected by the suction pressure detector is lower than the threshold suction pressure, or that the discharge pressure detected by the discharge pressure detector is lower than the threshold discharge pressure, is satisfied.

* * * * *